(12) United States Patent
Chin et al.

(10) Patent No.: US 9,988,530 B2
(45) Date of Patent: Jun. 5, 2018

(54) POLYCARBONATE RESIN COMPOSITION AND A MOLDED PRODUCT PRODUCED FROM THE SAME

(71) Applicant: Lotte Advanced Materials Co., Ltd., Yeosu-si (KR)

(72) Inventors: Kyoungsik Chin, Uiwang-si (KR); Seungshik Shin, Uiwang-si (KR); Sang Ki Park, Uiwang-si (KR); Kihong Choi, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 59 days.

(21) Appl. No.: 14/706,256

(22) Filed: May 7, 2015

(65) Prior Publication Data

US 2015/0322259 A1    Nov. 12, 2015

(30) Foreign Application Priority Data

May 7, 2014 (KR) ........................ 10-2014-0054365

(51) Int. Cl.
*C08L 69/00* (2006.01)
*C08L 67/03* (2006.01)

(52) U.S. Cl.
CPC .............. *C08L 69/00* (2013.01); *C08L 67/03* (2013.01); *C08L 2201/10* (2013.01); *C08L 2205/03* (2013.01); *C08L 2205/035* (2013.01)

(58) Field of Classification Search
CPC ....................................................... C08L 69/00
See application file for complete search history.

(56) References Cited

U.S. PATENT DOCUMENTS

| | | | | |
|---|---|---|---|---|
| 5,463,013 A * | 10/1995 | Tokuda | ................. | C07C 69/708 |
| | | | | 524/601 |
| 2006/0135690 A1* | 6/2006 | Juikar | ................. | C08G 77/448 |
| | | | | 525/67 |
| 2010/0157217 A1 | 6/2010 | Kim et al. | | |
| 2013/0317142 A1* | 11/2013 | Chen | ...................... | C08L 71/12 |
| | | | | 524/116 |
| 2013/0317150 A1* | 11/2013 | Wan | ........................ | C08L 67/02 |
| | | | | 524/127 |
| 2015/0353732 A1* | 12/2015 | Wang | ..................... | C08L 83/04 |
| | | | | 524/141 |
| 2015/0368459 A1* | 12/2015 | Yamanaka | .............. | C08L 67/03 |
| | | | | 524/504 |
| 2016/0045917 A1* | 2/2016 | Malinoski | ............. | B01L 3/5027 |
| | | | | 422/503 |

FOREIGN PATENT DOCUMENTS

KR    10-2010-0071486 A    6/2010

* cited by examiner

*Primary Examiner* — Megan McCulley
(74) *Attorney, Agent, or Firm* — Additon, Higgins & Pendleton, P.A.

(57) ABSTRACT

A polycarbonate resin composition and a molded product produced from the same includes (a) polycarbonate resin; (b) polycarbonate-polysiloxane copolymer; (c) aromatic copolyester resin; and (d) glass fiber.

9 Claims, No Drawings

POLYCARBONATE RESIN COMPOSITION AND A MOLDED PRODUCT PRODUCED FROM THE SAME

CROSS-REFERENCE TO RELATED APPLICATION

This application claims the benefit of priority under 35 U.S.C. § 119(a) of Korean Patent Application No. 10-2014-0054365, filed on May 7, 2014, in the Korean Intellectual Property Office, the entire disclosure of which is incorporated herein by reference for all purposes.

FIELD

Various embodiments of the present invention relate to a polycarbonate resin composition and a molded product produced from the same.

BACKGROUND

Polycarbonate is a type of engineering plastic that is in wide use in plastic industries.

Polycarbonate exhibits high resistance to heat since its glass transition temperature (Tg) may reach to about 150° C. due to a bulky molecular structure imparted thereto by, for example, bisphenol-A, and its carbonyl radicals of a carbonate group exhibit excellent rotary movement, thus providing ductility and rigidity to the polycarbonate. Furthermore, polycarbonate is an amorphous polymer having excellent transparency.

Not only that, polycarbonate has excellent impact resistance and compatibility with other resins, and thus is being used in a wide range of fields such as the electric•electronic field, optical instrument field, automobile field, construction field, medical field, food container field and other everyday life materials field and so forth.

Various kinds of inorganic fillers may be added to polycarbonate in order to improve the modulus and economic feasibility. Herein, examples of inorganic fillers that may be added include glass fiber, carbon fiber, carbon black and the like.

However, there is a problem that the polycarbonate matrix and the added inorganic filler have different refractive indexes, and the difference of refractive index of an interface between the matrix and the added inorganic filler affect transmittance and haze, resulting in a deterioration of transparency.

In order to resolve this problem, a polycarbonate copolymerized with polydimethylsiloxane (PDMS) has been used as a base resin together with the polycarbonate, but there still remains a problem of the transparency deteriorating significantly as the content of silicon in the polydimethylsiloxane increases.

Thus, there is still a need for a polycarbonate having excellent transparency while maintaining a good level of impact strength.

SUMMARY

Therefore, a purpose of various embodiments of the present disclosure is to resolve the aforementioned problems of conventional technology, that is, to provide a polycarbonate resin composition that can have excellent impact strength while maintaining a high transmittance and low haze, and a molded product produced from the same.

An embodiment of the present disclosure provides a polycarbonate resin composition including: (a) polycarbonate resin; (b) polycarbonate-polysiloxane copolymer; (c) aromatic copolyester resin; and (d) glass fiber.

The polycarbonate resin composition may include about 20 to about 60 weight % of polycarbonate resin (a); about 10 to about 40 weight % of polycarbonate-polysiloxane copolymer (b); about 10 to about 40 weight % of aromatic copolyester resin (c); and about 5 to about 30 weight % of glass fiber (d).

The composition may include silicon in an amount of about 0.1 to about 5 weight % per about 100 weight % of the polycarbonate resin composition.

A weight ratio of the polycarbonate-polysiloxane copolymer (b) and the aromatic copolyester resin (c) may be about 1:0.5 to about 1:3.

The aromatic copolyester resin (c) may be glycol modified polycyclohexanedimethylene terephthalate (PCTG) resin.

The polycarbonate-polysiloxane copolymer (b) may include about 80 to about 99 weight % of polycarbonate block and about 1 to about 20 weight % of polysiloxane block.

The polycarbonate-polysiloxane copolymer (b) may have a weight average molecular weight of about 15,000 to about 40,000 g/mol.

The glass fiber (d) may be an epoxy-coated glass fiber.

The difference between a refractive index of the glass fiber (d) and an average refractive index of the polycarbonate resin (a), polycarbonate-polysiloxane copolymer (b) and aromatic copolyester resin (c) may be less than or about 0.03.

The polycarbonate resin composition may further include at least one of a flame-retardant, lubricant, plasticizer, thermal stabilizer, antioxidant, photostabilizer, and/or coloring agent.

Another embodiment of the present disclosure provides a molded product produced from the aforementioned polycarbonate resin composition.

The molded product may have an Izod impact strength of about 10 to about 15 kg·cm/cm when measured according to ASTM D256, and a transmittance of about 87% or more when measured according to ASTM D1003.

The polycarbonate resin composition according to the embodiment of the present disclosure limits the amount of silicon in the polycarbonate resin composition and includes the aromatic copolyester resin, thereby controlling the refractive index difference with the glass fiber, and thus the polycarbonate resin composition can exhibit excellent transmittance and low Haze, resulting in excellent transparency.

The aforementioned ingredients used in the polycarbonate resin composition also can have excellent compatibility with the polycarbonate resin composition, thereby exhibiting excellent impact resistance.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, explanation will be made on a polycarbonate resin composition of the present disclosure.

(a) Polycarbonate Resin

Polycarbonate resin (a) is a polyester combined with carbonate, but there is no limitation thereto, and thus any polycarbonate available in the resin composition field may be used.

The polycarbonate resin may be produced by reacting one or more diphenols with phosgene, halogen acid ester, carbonate ester, or a combination thereof.

The diphenol may be a combination of two or more kinds of diphenols forming a unit repeated in the polycarbonate resin.

Examples of the diphenol include without limitation hydroquinone, resorcinol, 4,4'-dihydroxydiphenyl, 2,2-bis(4-hydroxyphenyl)propane (also referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyl)enyl)ketone, bis(4-hydroxyl)enyl)ether and the like, and combinations thereof. In exemplary embodiments, 2,2-bis(4-hydroxyphenyl)propane, 2,2-bis(3,5-dichloro-4-hydroxyphenyl)propane and/or 1,1-bis(4-hydroxyphenyl)cyclohexane, for example, 2,2-bis(4-hydroxyphenyl)propane, may be used.

The polycarbonate resin may be a copolymer produced from two or more diphenols.

The polycarbonate resin used herein may be a linear polycarbonate resin, a branched type polycarbonate resin, and/or polyester-carbonate copolymer resin.

The linear polycarbonate resin may be, for example, a bisphenol-A type polycarbonate resin. An example of the branched type polycarbonate resin may be a polymer produced by reacting a polyfunctional aromatic compound such as trimellitic anhydride and/or trimellitic acid with a diphenol and carbonate. The polyester-carbonate copolymer resin may be produced by reacting a difunctional carboxylic acid with a diphenol and carbonate, and the carbonate used herein may be diarylcarbonate such as diphenylcarbonate and/or ethylene carbonate.

The polycarbonate resin composition may include the polycarbonate resin in an amount of about 20 to about 60 weight %, for example about 25 to about 50 weight %, based on 100 weight % (the total weight) of the polycarbonate resin composition. In some embodiments, the polycarbonate resin composition may include the polycarbonate resin in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 weight %. Further, according to some embodiments of the present invention, the amount of the polycarbonate resin can be in a range from about any of the foregoing amounts to about any other of the foregoing amounts.

When the polycarbonate resin composition includes the polycarbonate resin in an amount within the above range, the composition can have excellent impact resistance, heat resistance, and/or processability.

(b) Polycarbonate-Polysiloxane Copolymer

The polycarbonate-polysiloxane copolymer (b) includes a polycarbonate block and a polysiloxane block.

The polycarbonate block may include the aforementioned polycarbonate resin (a) or a structure unit derived therefrom.

The polysiloxane block may include a structure unit that may be expressed as Chemical Formula I shown below.

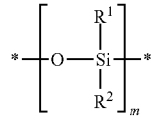

[Chemical Formula 1]

In Chemical Formula 1 shown above, $R^1$ and $R^2$ may be identical or different from each other, and may be a hydrogen atom, substituted or unsubstituted C1 or C20 alkyl radical, substituted or unsubstituted C2 to C20 alkenyl radical, substituted or unsubstituted C2 to C20 alkenyl radical, substituted or unsubstituted C1 to C20 alkoxy radical, substituted or unsubstituted C3 to C30 cycloalkyl radical, substituted or unsubstituted C3 to C30 cycloalkenyl radical, substituted or unsubstituted C3 to C30 cycloalkynyl radical, substituted or unsubstituted C6 to C30 aryl radical, substituted or unsubstituted C6 to C30 aryloxy radical, substituted or unsubstituted C6 to C30 aryl radical, or NRR' (wherein R and R' may be identical or different from each other, and may be a hydrogen atom, or substituted or unsubstituted C1 to C20 alkyl radical), and m is a natural number satisfying 2≤m>10,000. As used herein, the term "substituted" means that a hydrogen atom is substituted with a substituent selected from the group consisting of a halogen group, a C1 to C30 alkyl group, a C1 to C30 haloalkyl group, a C6 to C30 aryl group, a C1 to C2 alkoxy group and combinations thereof.

In the above Chemical Formula 1, m can be between 2 and 10,000, for example, between 2 and 1,000, as another example between 10 and 100, and as yet another example between 25 and 80. This range can be advantageous for extrusion processing since the polysiloxane block can have excellent impact resistance and an adequate viscosity can be maintained.

The polycarbonate-polysiloxane copolymer may include about 1 to about 99 weight % of polycarbonate block and about 1 to about 99 weight % of polysiloxane block, each based on 100 weight % (the total weight) of the polycarbonate-polysiloxane copolymer. For example, the polycarbonate-polysiloxane copolymer may include about 80 to about 99 weight % of polycarbonate block and about 1 to about 20 weight % of polysiloxane block. As another example, the polycarbonate-polysiloxane copolymer may include about 80 to about 95 weight % of polycarbonate block and about 5 to about 20 weight % of polysiloxane block. In the aforementioned range, the polycarbonate-polysiloxane copolymer can have excellent impact resistance.

Furthermore, the polycarbonate-polysiloxane copolymer may include about 1 to about 5 weight % of polydimethylsiloxane (PDMS), for example, about 1.5 to about 3 weight % of polydimethylsiloxane (PDMS), based on 100 weight % (the total weight) of the polycarbonate-polysiloxane copolymer. When the polycarbonate-polysiloxane copolymer includes polydimethylsiloxane in an amount within the aforementioned range, the polycarbonate resin composition can have excellent impact resistance and transparency.

The weight average molecular weight of the polycarbonate-polysiloxane copolymer may be about 10,000 to about 50,000 g/mol, for example about 15,000 to about 40,000 g/mol. The polycarbonate-polysiloxane copolymer having the aforementioned range of weight average molecular weight can exhibit excellent impact resistance without deteriorating the transparency.

The polycarbonate-polysiloxane copolymer may reinforce the impact resistance of the polycarbonate resin composition.

Furthermore, the polycarbonate resin composition may include silicon in an amount of about 0.1 to about 5 weight %, for example about 0.3 to about 3 weight %, based on 100 weight % (the total weight) of the polycarbonate resin composition. In some embodiments, the polycarbonate resin composition may include silicon in an amount of about 0.1, 0.2, 0.3, 0.4, 0.5, 0.6, 0.7, 0.8, 0.9, 1, 2, 3, 4, or 5 weight %. Further, according to some embodiments of the present invention, the amount of silicon can be in a range from about any of the foregoing amounts to about any other of the foregoing amounts.

When the polycarbonate resin composition includes silicon in an amount within the above range, the composition can exhibit excellent impact resistance and/or transparency.

The polycarbonate resin composition may include the polycarbonate-polysiloxane copolymer in an amount of about 10 to about 40 weight %, for example about 20 to about 40 weight %, based on 100 weight % (the total weight) of the polycarbonate resin composition. In some embodiments, the polycarbonate resin composition may include the polycarbonate-polysiloxane copolymer in an amount of about 10, 11, 12, 13, 14, 15, 16 17, 18, 19, 20, 21, 22, 23, 24, 25, 26, 27, 28, 29, 30, 31, 32, 33, 34, 35, 36, 37, 38, 39, or 40 weight %. Further, according to some embodiments of the present invention, the amount of the polycarbonate-polysiloxane copolymer can be in a range from about any of the foregoing amounts to about any other of the foregoing amounts.

When the polycarbonate resin composition includes the polycarbonate-polysiloxane copolymer in an amount within the aforementioned range, the composition may have an excellent balance of properties of impact resistance, heat resistance and processability.

(c) Aromatic Copolyester Resin

Aromatic copolyester resin (c) is blended with the aforementioned polycarbonate resin (a) and polycarbonate-polysiloxane copolymer (b) to improve the optically transparent effect.

The aromatic copolyester resin may be a polyester resin including a diol component and a dicarboxylic acid component. The diol component may include repeat units derived from a $C_2$ to $C_{10}$ aliphatic diol and/or a $C_6$ to $C_{30}$ alicyclic diol and/or a $C_6$ to $C_{30}$ aromatic diol. For example, the aromatic copolyester resin may include a unit derived from 1,4-cyclohexanedimethanol.

The dicarboxylic acid component may include repeat units derived from one or more $C_6$ to $C_{20}$ aromatic and/or $C_6$ to $C_{20}$ alicyclic dicarboxylic acid.

In exemplary embodiments, a $C_2$ to $C_{10}$ linear, $C_4$ to $C_{10}$ branched, and/or $C_6$ to $C_{30}$ cyclic alkane diol may be used together with 1,4-cyclohexanedimethanol as the diol. For example, the diol may include without limitation ethylene glycol, propylene glycone, and/or butane diol. Furthermore, terephthalic acid, isophthalic acid, and/or adipic acid may be used as the dicarboxylic acid. In exemplary embodiments, the aromatic copolyester resin may be glycol modified polycyclohexanedimethylene terephthalate (PCTG) resin.

There is no particular limitation to the degree of polymerization of the glycol modified polycyclohexanedimethylene terephthalate (PCTG) resin, but the intrinsic viscosity may be about 0.3 to about 1.2 dl/g when measured in a chloroform solution at 25° C., for example about 0.5 to about 1.0 dl/g. Within the aforementioned range, the resin can have excellent transparency and transparency, and may be easily processed.

The aromatic copolyester resin can be highly compatible with polycarbonate resin, and thus it can be possible to maintain the excellent properties of polycarbonate resin, and particularly, realize high level of impact strength.

The polycarbonate resin composition may include the aromatic copolyester resin in an amount of about 10 to about 40 weight %, for example about 15 to about 30 weight %, based on 100 weight % (the total weight) of polycarbonate resin composition. In some embodiments, the polycarbonate resin composition may include the aromatic copolyester resin in an amount of about 10, 11, 12, 13, 14, 15, 16 17, 18, 19, 20, 21, 22, 23, 24, 25, 26, 27, 28, 29, 30, 31, 32, 33, 34, 35, 36, 37, 38, 39, or 40 weight %. Further, according to some embodiments of the present invention, the amount of the aromatic copolyester resin can be in a range from about any of the foregoing amounts to about any other of the foregoing amounts.

When the polycarbonate resin composition includes the aromatic copolyester resin in an amount below about 10 weight %, the transparency can decrease, and when the polycarbonate resin composition includes the aromatic copolyester resin in an amount above about 40 weight %, there may be less effect of transparency improvement and the compatibility with polycarbonate resin may decrease.

Furthermore, in order to improve the properties of the polycarbonate resin composition, the weight ratio of the polycarbonate-polysiloxane copolymer and the aromatic copolyester resin may be about 1:0.5 to about 1:3, for example about 1:0.7 to about 1:2.5. When the weight ratio of the two compounds is less than 1:0.5 or above 1:3, the transparency or impact resistance may fall significantly.

(d) Glass Fiber

Glass fiber (d) is a compound produced by melting and processing glass of which the main ingredient is silicate and then processing it to have the shape of fiber. It is possible to obtain the degree of mechanical strength that one wants by adjusting the amount of additives.

Such glass fiber is commonly used in the related field, of which the diameter may be about 8 to about 20 μm, and the length may be about 1.5 to about 8 mm. When the diameter is within this range, it is possible to obtain excellent impact resistance effects, and when the length of the glass fiber is within the aforementioned range, the glass fiber may be easily put into a processing device such as an extruder, and the effect of impact improvement may be significantly improved as well.

The glass fiber may be mixed with fiber selected from carbon fiber, basalt fiber, fiber produced from biomass, and a combination thereof, and be used. The biomass means organisms used as energy sources such as plants or microbes.

The glass fiber used herein may be circular, elliptical, or have a shape of a dumbbell with two circles connected.

The glass fiber used herein may have a cross-sectional aspect ratio of less than about 1.5, for example, it may be a circular glass fiber with a cross-sectional aspect ratio of about 1. Herein, the aspect ratio is defined as the ratio of the smallest diameter of a cross-section of the glass fiber to the biggest diameter of a cross-section of the glass fiber. When using a glass fiber having the aforementioned range of aspect ratio, it is possible to reduce the cost, and when using a glass fiber with a circular cross-section, it is possible to improve dimensional stability and appearance.

In order to prevent the glass fiber from reacting with the polycarbonate resin and improve the degree of impregnation, it is possible to apply a predetermined treatment agent to the glass fiber. Applying this predetermined treatment agent may be performed when manufacturing the glass fiber or in a subsequent process. The predetermined treatment agent may be a lubricant, coupling agent and/or surfactant. The lubricant is used to form a good strand having a certain diameter thickness when manufacturing the glass fiber, and the coupling serves to apply a good adhesion between the glass fiber and the resin.

The glass fiber may be coated with a polymer resin. For example, a glass fiber coated with epoxy and/or a glass fiber coated with urethane may be used. The epoxy-coated glass fiber can have excellent compatibility with the polycarbonate resin and polycarbonate-polysiloxane copolymer, and thus can improve mechanical properties.

The glass fiber may be produced by a conventional method, for example, by pulling out a melt glass through a nozzle having a very small diameter, and then quickly cooling and consolidating the glass so that it may not be crystallized instantly.

The polycarbonate resin composition may include the glass fiber in an amount of about 5 to about 30 weight % based on 100 weight % (the total weight) of the polycarbonate resin composition. In some embodiments, the polycarbonate resin composition may include the glass fiber in an amount of about 5, 6, 7, 8, 9, 10, 11, 12, 13, 14, 15, 16 17, 18, 19, 20, 21, 22, 23, 24, 25, 26, 27, 28, 29, or 30 weight %. Further, according to some embodiments of the present invention, the amount of the glass fiber can be in a range from about any of the foregoing amounts to about any other of the foregoing amounts.

The polycarbonate resin composition including the glass fiber in an amount within this range can have excellent impact resistance and/or transparency.

The difference between the refractive index of the glass fiber (d) and the average refractive index of the polycarbonate resin (a), polycarbonate-polysiloxane copolymer (b) and aromatic copolyester resin (c) may be about 0.03 or less, for example about 0.01 or less, and as another example about 0.005 or less. Herein, the average refractive index refers to an average of the refractive indexes of polycarbonate resin (a), polycarbonate-polysiloxane copolymer (b) and aromatic copolyester resin (c).

The closer the refractive index of the glass fiber is to the refractive indexes of other materials that form the matrix of the polycarbonate resin composition, the greater the transparency of the polycarbonate resin composition.

The polycarbonate resin composition may include one or more additional additives depending on its purpose of use. Examples of such additives include without limitation a flame-retardant, lubricant, plasticizer, thermal stabilizer, antioxidant, photostabilizer, coloring agent, and the like, and two or more of these may be mixed and used depending on the characteristics of the final molded product.

The flame-retardant is a substance that reduces combustibility. Examples of the flame-retardant may include, without limitation, at least one of a phosphate compound, phosphite compound, phosphonate compound, polysiloxane, phosphazene compound, phosphinate compound, and/or melamine compound.

The lubricant is a substance that lubricates a metal surface that is in contact with the polycarbonate resin composition during processing•molding•extruding so as to help the flow or motion of the resin composition. A conventional lubricant may be used herein.

The plasticizer is a substance that increases the flexibility, process usability and/or expansibility of the polycarbonate resin composition. A conventional plasticizer may be used herein.

The thermal stabilizer is a substance that restricts thermal decomposition of the polycarbonate resin composition when being mulled or molded at a high temperature. A conventional thermal stabilizer may be used herein.

The antioxidant is a substance that prevents the resin composition from being decomposed and thus losing its intrinsic properties by restricting and/or blocking chemical reactions between the polycarbonate resin composition and oxygen. Examples of antioxidant include, without limitation, a phenol type antioxidant, phosphite type antioxidant, thioether type antioxidant, and/or amine type antioxidant.

The photostabilizer is a substance that restricts and/or blocks the polycarbonate resin composition from being decomposed and thus losing its color or mechanical properties. Titanium dioxide may be used as a photostabilizer.

As the coloring, a pigment and/or dye may be used.

The polycarbonate resin composition may include the additive(s) in an amount of about 1 to about 15 parts by weight per about 100 parts by weight of the polycarbonate resin (a), polycarbonate-polysiloxane copolymer (b), aromatic copolyester resin (c) and glass fiber (d) combined.

The aforementioned polycarbonate resin composition includes a certain amount of polydimethylsiloxane and aromatic copolyester resin in addition to the polycarbonate resin, and thus can exhibit excellent impact strength and/or transparency.

The aforementioned polycarbonate resin composition may have an Izod Impact Strength of about 5 to about 20 kgf·cm/cm when measured for a ⅛" thickness notch Izod specimen by an evaluation method provided in the ASTM D256, for example about 10 to about 15 kgf·cm/cm. The Izod impact strength is obtained by dividing the absorption energy obtained based on the height by which a pendulum rotates when being hit, with a cross-sectional area of the specimen notch unit. When the Izod impact strength is within the aforementioned range, it is possible to obtain a high level of impact strength.

The aforementioned polycarbonate resin composition may have a transmittance of about or above 87%, for example about or above 89%. The polycarbonate resin composition within this range exhibits can excellent transparency and may realize a variety of colors.

The polycarbonate resin composition according to the present disclosure may be produced by a well known method for producing a resin composition. For example, the polycarbonate resin composition according to the present disclosure may be produced in a pellet form by mixing the ingredients of the present disclosure with other optional additives simultaneously and then melting•extruding the same in an extruder.

The molded product according to an embodiment of the present disclosure may be provided from the aforementioned polycarbonate resin composition. The polycarbonate resin composition can exhibit excellent impact strength and/or transparency and may thus be applied, without limitation, to any molded product requiring such characteristics.

EXAMPLES

Hereinafter, explanation will be made on a test conducted to demonstrate the excellent effects of the polycarbonate resin composition of the present disclosure.

The ingredients used in the polycarbonate resin compositions of the examples exemplifying the invention and comparative examples are as follows.

(a) Polycarbonate Resin

A polycarbonate resin product with a flow index of 19±2 g/10 min at 250° C., 1.2 kg according to ISO 1133 of Cheil Industries Inc. is used.

(b) Polycarbonate-Polysiloxane Resin

A polycarbonate-polysiloxane resin with a flow index of 13±3 g/10 min at 250° C., 1.2 kg according to ISO 1133 of IDEMITSU Inc., wherein the content of polydimethylsiloxane is 2.1% is used.

(c) Aromatic Copolyester Resin
(c-1) A glycol modified polycyclohexanedimethylene terephthalate (PCTG) resin product with a flow index of 36±4 g/10 min at 250° C., 1.2 kg according to ISO 1133 of SKC Inc. is used.
(c-2) Instead of the aromatic copolyester rein, polylactic acid that is a product of Natureworks 4032D of Natureworks Inc. is used.

(d) Glass Fiber
(d–1) An epoxy coated glass fiber product with a length of 3 mm and diameter of 10 μm of KCC Inc. is used.
(d-2) An urethane coated glass fiber product with a length of 3 mm and diameter of 10 μm of KCC Inc. is used.

(e) Other Additives
(e-1) Bisphenol-A diphosphate product of YOKE Chemicals Inc. is used as flame-retardant.
(e-2) The antioxidant and lubricant is used in same amounts.

The polycarbonate resin compositions of the examples exemplifying the invention and comparative examples are produced according to the content ratios shown in table 1 below.

Referring to table 1, the weight of the polycarbonate resin (a), polycarbonate-polysiloxane resin (b), aromatic copolyester resin (c) and glass fiber (d) combined is 100 weight %. The weight ratios of other additives are shown per 100 parts by weight of the polycarbonate resin (a), polycarbonate-polysiloxane resin (b), aromatic copolyester resin (c) and glass fiber (d) combined.

The ingredients disclosed in table 1 are dry-mixed, put into a supply unit of a twin-screw extruder (L/D=25, 45 mm) successively, and then melted, mulled and compressed. Next, the polycarbonate resin composition that has been pelletized through the extruder is dried at about 80° C. for about 6 hours, and then a specimen is extracted at about 280° C. using an extractor.

TABLE 1

| Ingredients | | a | b | c-1 | c-2 | d-1 | d-2 | e-1 | e-2 |
|---|---|---|---|---|---|---|---|---|---|
| Examples | 1 | 50 | 20 | 15 | — | 15 | — | 10 | 0.4 |
| | 2 | 30 | 20 | 30 | — | 15 | — | 10 | 0.4 |
| Comparative | 1 | 85 | — | — | — | 15 | — | 10 | 0.4 |
| Examples | 2 | 85 | — | — | — | — | 15 | 10 | 0.4 |
| | 3 | 65 | 20 | — | — | 15 | — | 10 | 0.4 |
| | 4 | 45 | 40 | — | — | 15 | — | 10 | 0.4 |
| | 5 | 65 | — | 20 | — | 15 | — | 10 | 0.4 |
| | 6 | 45 | — | 40 | — | 15 | — | 10 | 0.4 |
| | 7 | 50 | 20 | — | 15 | 15 | — | 10 | 0.4 |
| | 8 | 65 | 15 | 5 | — | 15 | — | 10 | 0.4 |
| | 9 | 25 | 45 | 15 | — | 15 | — | 10 | 0.4 |
| | 10 | 25 | 10 | 60 | — | 5 | — | 10 | 0.4 |

Impact strength and transparency of the polycarbonate resin compositions of Examples 1 and 2 and Comparative Examples 1 to 10 are evaluated using the tests shown below and the evaluation results are as shown in table 2 below.

<Impact Strength Evaluation>

A notch is formed on an Izod specimen of a thickness of ⅛" produced according to Examples 1 and 2 and Comparative Examples 1 to 10, and Izod impact strength is measured at temperatures 23±2° C. and relative humidity of 50±5% by the method provided in the ASTM D256 standard <Transparency Evaluation>

Transparency is measured for each specimen of Examples 1 and 2 and Comparative Examples 1 to 10 by the method provided in the ASTM D1003 standard using a Haze meter YDP02-OD of NIPPON DENSHOKU Inc.

TABLE 2

| | | Izod impact strength | Transparency | |
|---|---|---|---|---|
| | | (kgf · cm/cm) | Transmittance (%) | Haze (%) |
| Examples | 1 | 11.8 | 89.5 | 24.2 |
| | 2 | 12.5 | 90.2 | 25.1 |
| Comparative | 1 | 8.3 | 80.7 | 86.2 |
| Examples | 2 | 8.6 | 55.7 | 90.4 |
| | 3 | 10.1 | 82.3 | 67.2 |
| | 4 | 14.7 | 87.8 | 70.1 |
| | 5 | 7.3 | 87.3 | 60.2 |
| | 6 | 6.2 | 89.4 | 70.3 |
| | 7 | 5.9 | 88.2 | 85.7 |
| | 8 | 10.5 | 87.5 | 80.5 |
| | 9 | 11.2 | 88.3 | 40.7 |
| | 10 | 5.5 | 90.2 | 35.2 |

From table 1 and table 2, one can see that the polycarbonate resin composition according to Examples 1 and 2 exhibit excellent impact strength and transparency.

The polycarbonate resin composition according to Comparative Examples 1 and 2 produced without adding the polycarbonate-polysiloxane copolymer and aromatic copolyester resin exhibit low impact strength and transmittance, and a high haze.

Furthermore, the polycarbonate resin composition wherein only polycarbonate-polysiloxane copolymer is added (Comparative Examples 3 and 4), or wherein only glycol modified polycyclohexanedimethylene terephthalate resin is added (Comparative Examples 5 and 6) exhibit low Izod impact strength and transmittance and a high Haze compared to the examples exemplifying the invention.

The polycarbonate resin composition wherein polylactic acid is added instead of glycol modified polycyclohexanedimethylene terephthalate resin (Comparative Example 7) exhibits a high Haze and low transmittance and extremely low impact strength compared to the examples exemplifying the invention. Furthermore, polycarbonate resin composition including components in amount outside the content ratio range of the present disclosure (Comparative Examples 8, 9 and 10) exhibit a low impact strength and transmittance.

Based on the aforementioned, one can see that the polycarbonate-polysiloxane copolymer and aromatic copolyester resin may have an important effect on the impact strength and transparency of the polycarbonate resin composition.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A polycarbonate resin composition comprising:
    (a) about 20 to about 60 weight % of polycarbonate resin;
    (b) about 10 to about 40 weight % of polycarbonate-polysiloxane copolymer;
    (c) about 15 to about 40 weight % of aromatic copolyester resin, wherein the aromatic copolyester resin (c) is glycol modified polycyclohexanedimethylene terephthalate (PCTG) resin; and
    (d) about 5 to about 30 weight % of glass fiber,
    wherein a molded product produced from the polycarbonate resin composition has an Izod impact strength of about 10 to about 15 kgf·cm/cm measured according to the ASTM D256 and a transmittance of about 87% or greater measured according to the ASTM D1003.

2. The composition according to claim 1, further comprising silicon in an amount of about 0.1 to about 5 weight % per about 100 weight % of the polycarbonate resin composition.

3. The composition according to claim 1, comprising a weight ratio of the polycarbonate-polysiloxane copolymer (b) and the aromatic copolyester resin (c) of about 1:0.5 to about 1:3.

4. The composition according to claim 1, wherein the polycarbonate-polysiloxane copolymer (b) comprises about 80 to about 99 weight % of polycarbonate block and about 1 to about 20 weight % of polysiloxane block.

5. The composition according to claim 1, wherein the polycarbonate-polysiloxane copolymer (b) has a weight average molecular weight of about 15,000 to about 40,000 g/mol.

6. The composition according to claim 1, wherein the glass fiber (d) is an epoxy-coated glass fiber.

7. The composition according to claim 1, wherein a difference between a refractive index of the glass fiber (d) and an average refractive index of the polycarbonate resin (a), polycarbonate-polysiloxane copolymer (b) and aromatic copolyester resin (c) is or below about 0.03.

8. The composition according to claim 1, wherein the polycarbonate resin composition further comprises at least one of a flame-retardant, lubricant, plasticizer, thermal stabilizer, antioxidant, photostabilizer, and coloring agent.

9. A molded product produced from the polycarbonate resin composition of claim 1.

* * * * *